July 16, 1929.  V. V. VEENSCHOTEN  1,720,938

VALVE

Filed Aug. 6, 1926

Vincent V. Veenschoten
INVENTOR.

BY
ATTORNEYS.

Patented July 16, 1929.

1,720,938

UNITED STATES PATENT OFFICE.

VINCENT V. VEENSCHOTEN, OF ERIE, PENNSYLVANIA, ASSIGNOR TO NORTHERN EQUIPMENT COMPANY, OF ERIE, PENNSYLVANIA, A CORPORATION OF PENNSYLVANIA.

VALVE.

Application filed August 6, 1926. Serial No. 127,676.

The invention is directed to improvements in valves, particularly of the gate valve type, providing a structure which can be readily manufactured as for instance from drop forgings and which is capable of controlling very high pressures. It is also formed so that the seat surfaces may be readily machined, the surfaces being exposed by points of separation in the parts of the body. The gate is also of improved construction making a very efficient structure from the point of manufacture. Features and details of the invention will appear from the specification and claims.

The invention is illustrated in the accompanying drawings as follows:—

Figure 1:
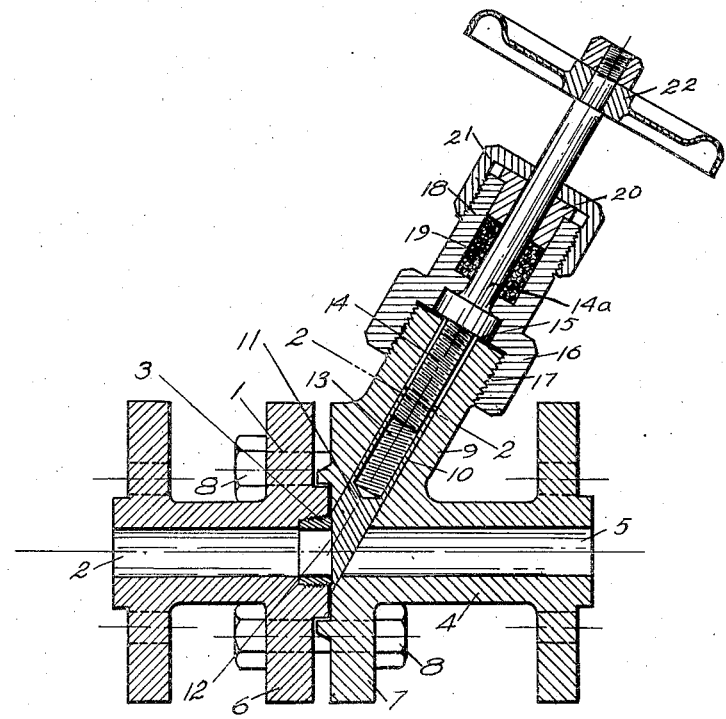

Fig. 1 shows a central section through the valve.

Figure 2:
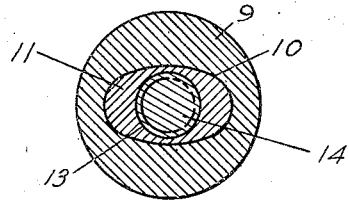

Fig. 2 a section on the line 2—2 in Fig. 1.

The body is made up of separable parts, 1, a seat portion having a passage 2 through it with a removable seat 3 surrounding the passage, 4 a gate portion having a passage 5 in continuation of the passage 2, the two making a straight passage through the body as a whole. The parts 1 and 4 have flanges 6 and 7 through which bolts 8 are passed securing the parts together.

A gate-carrying projection 9 extends from the gate portion 4. It has an oval gate passage 10 leading from the face of the seat 3 at an angle to the face of the seat and at an angle to the passage 2—5 through the body. A gate 11 has a beveled face 12 adapted to close on the seat 3.

The gate has a screw-threaded socket 13 in which operates a screw-threaded portion 14 of a stem 14ª. The stem has a shoulder 15 which is secured on the end of the projection 9 by a cap 16, the end of the projection 9 having screw threads 17 on to which the cap is screwed. The cap carries a projection 18 providing a stuffing box 19 in which a follower 20 operates. A flanged nut 21 is screwed on to the end of the projection 18 and exerts pressure on the follower to maintain a closure of the stuffing box. A handle 22 is arranged on the end of the stem 14ª and operates in the usual manner.

It will readily be seen that by turning the screw 14 the gate is forced toward or away from the seat 3 and that the angular or slanting direction of the gate with relation to its seat assures a wedging action forcing the gate against its seat. The separation of the body at the seat facilitates the machining of the seat and the gate opening. Thus a very efficient and at the same time very inexpensive valve is produced.

What I claim as new is:—

1. In a valve, the combination of a body having a straight passage therethrough, a seat surrounding the passage, said seat being at right-angles to the axis of the passage and a valve guide opening leading from the seat at an inclination to the face of the seat and to the passage; a valve gate having a stem in the opening, said stem filling and conforming to the cross sectional shape of the opening and the valve gate being formed with a face on an inclined cross section of the stem; and means operating on the stem to actuate the gate.

2. In a valve, the combination of a body having a passage throughout, a seat surrounding the passage, and a valve guide opening leading from the seat at an inclination to the face of the seat, said valve guide opening being oval in cross section; a valve gate having a stem rigid with the gate in the opening, the stem corresponding in shape to the opening and the gate being formed on a cross section of the stem; and means operating the stem to actuate the gate.

3. In a valve, the combination of a body having a seat portion and a gate portion, said body having a passage therethrough; a seat in the seat portion surrounding the passage, the body portions being severable at the seat and the gate portion having a gate opening therein extending at an inclination to the face of the seat and the passage; a gate slidingly mounted in the opening operating on the seat; and means operating the gate.

4. In a valve, the combination of a body having a passage throughout, a seat surrounding the passage, and a valve guide opening leading from the seat at an inclination to the face of the seat, said valve guide opening being out of round in cross section; a valve gate having a stem rigid with the gate in the opening, the stem corresponding in shape to the opening; and means operating the stem to actuate the gate.

In testimony whereof I have hereunto set my hand.

VINCENT V. VEENSCHOTEN.